Nov. 10, 1970  J. A. PADILLA  3,538,592
FRICTION WELDING

Filed July 17, 1967

Inventor
John A. Padilla
By Kenon Palmer
Stewart & Estabrook
Attorneys

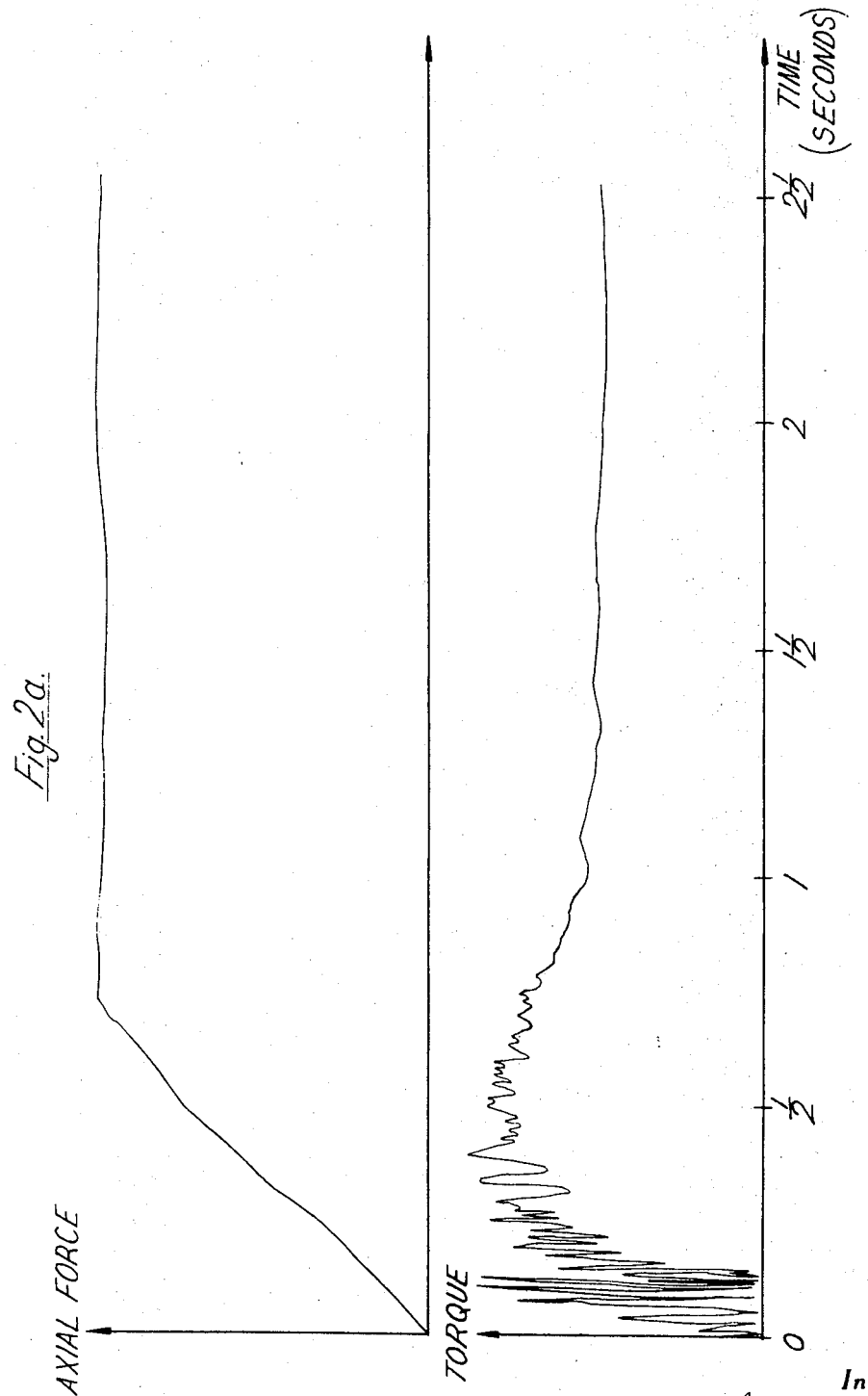

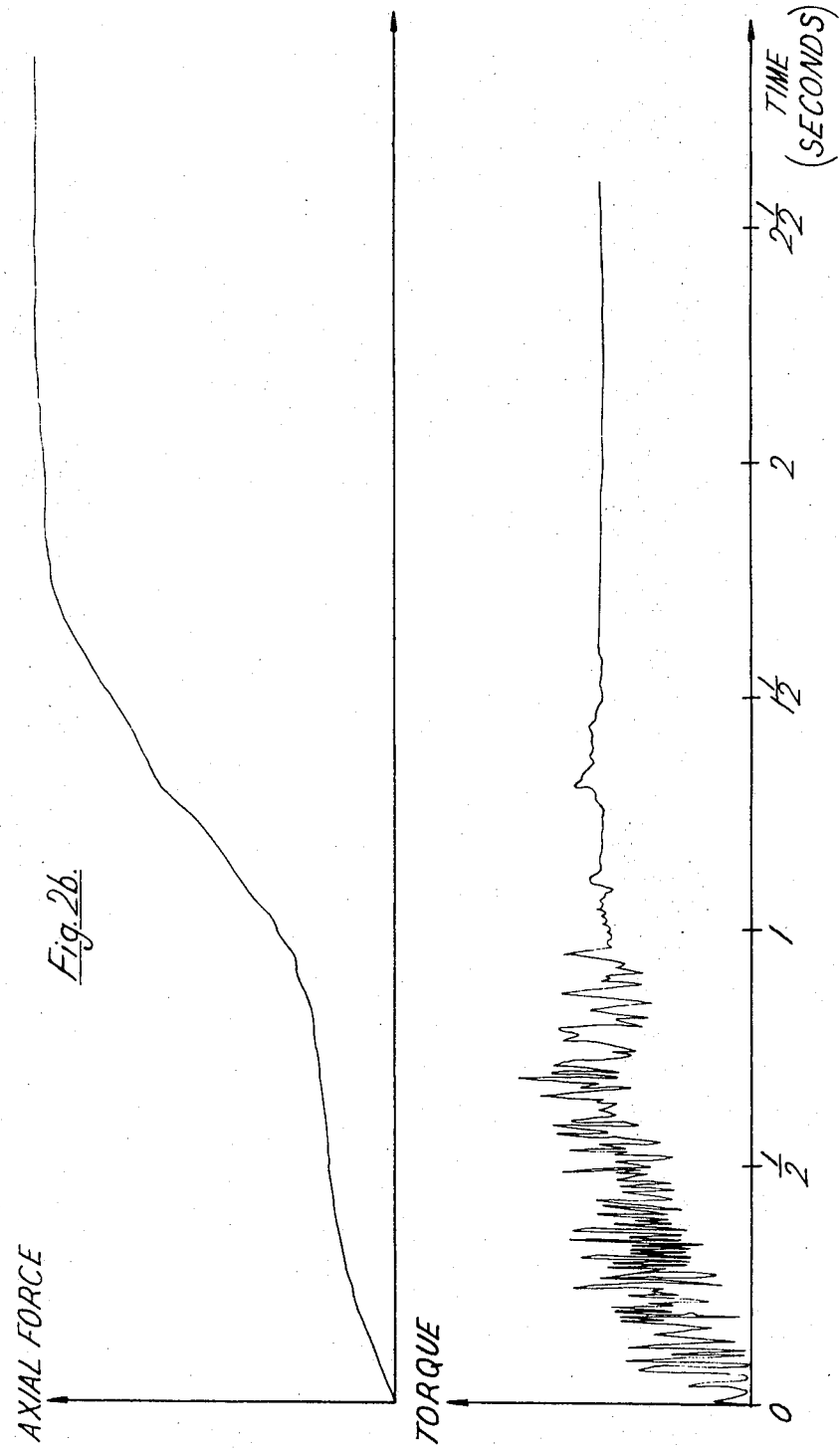

United States Patent Office 3,538,592
Patented Nov. 10, 1970

3,538,592
FRICTION WELDING
John Arthur Padilla, Lyn Cottage, Harlton, England, assignor to British Welding Research Association, Cambridge, England, a British body corporate
Filed July 17, 1967, Ser. No. 653,772
Claims priority, application Great Britain, July 18, 1966, 32,187/66
Int. Cl. B23k 27/00
U.S. Cl. 29—470.3        2 Claims

ABSTRACT OF THE DISCLOSURE

In friction welding, the load on a transmission system responsible for the relative rotation which heats the abutting ends of the workpieces is measured to provide a signal which acts through a closed-loop control system to vary the axial force as a function of the load. This closed-loop control is exerted at least during the initial portion of the friction heating cycle, when without such control the torque reaches a peak substantially in excess of its subsequent steady value and in this way the rating of the transmission system required is reduced.

---

In friction welding, two workpieces (generally bars or tubes of circular cross section) are placed in chucks with the surfaces to be joined in contact with one another and relative rotation is produced between the contacting faces under axial pressure. The resulting friction at the faces causes a rapid rise in temperature and when the temperature is sufficient for welding the relative rotation is stopped but the axial pressure is maintained or increased. During the welding process a certain amount of material is forced out of the contact area and forms a characteristic collar at the joint.

In this process, there is a considerable variation in the load imposed on the driving transmission. Initially, the two contacting surfaces are cold and there is therefore a considerable resistance to relative rotation. The speed of relative rotation varies with the distance from the axis of rotation. The increase in temperature and consequent increase in plasticity is accompanied by expansion of the metals at the interface. The interaction of these factors leads to a somewhat complex sequence of events, but there is always a torque peak soon after the beginning of relative rotation. Frequently, the overload capacity of an electric motor is used to carry the process over the high torque peak, but the overloading would have to be reduced if the duty cycle were increased, for example in an automatic machine working continuously.

According to the present invention, the transmission load in the rotary drive is measured and is used to control the axial welding force for at least the initial portion of the welding cycle so as to reduce the axial force during the peak torque period. This reduces the transmission load during this period and enables a driving system of much lower rating to be used.

In the preferred form of the invention, the control of the axial welding force as a function of the transmission load is continued for the major part of the heating cycle. However, where an upset pressure is applied during the period of deceleration of the relative rotation of the workpieces, the control of the axial force as a function of the transmission load must be discontinued before the initiation of deceleration. If desired, the duration of the controlled period can be defined by means of a pressure switch or a displacement switch sensing the axial pressure or the relative axial movement of the workpieces during the cycle. By continuing the controlled period beyond the peak torque period, the pressure is increased in the later stages of the welding cycle and this enables better utilisation of the available power and moreover stabilises the power demand.

Another advantage of the invention is that it makes it possible to control the friction welding process by means of an automatic timer. The difficulty with automation of friction welding by timing the process, is that individual welds vary a great deal in their initial stages and these initial stages may take very different periods of time to complete. In the final stages, however, they follow a much more regular pattern. The measurement of the transmission load provides a guide to recognisable points in the weld cycle, which can serve as points of initiation of the automatic timing process. These recognisable points may be the attainment of a certain axial pressure or the initiation of relative axial displacement of the workpieces.

The force applied to the workpiece may be controlled by the measured torque or by measurement of the power input to the drive system.

In order that the invention may be better understood, one example of apparatus embodying the invention will now be described with reference to the accompanying drawings, in which:

FIG. 2a shows typical torque and axial force curves in the absence of feedback; and FIG. 2b shows torque and force curves with a feedback control system.

Figure 1:
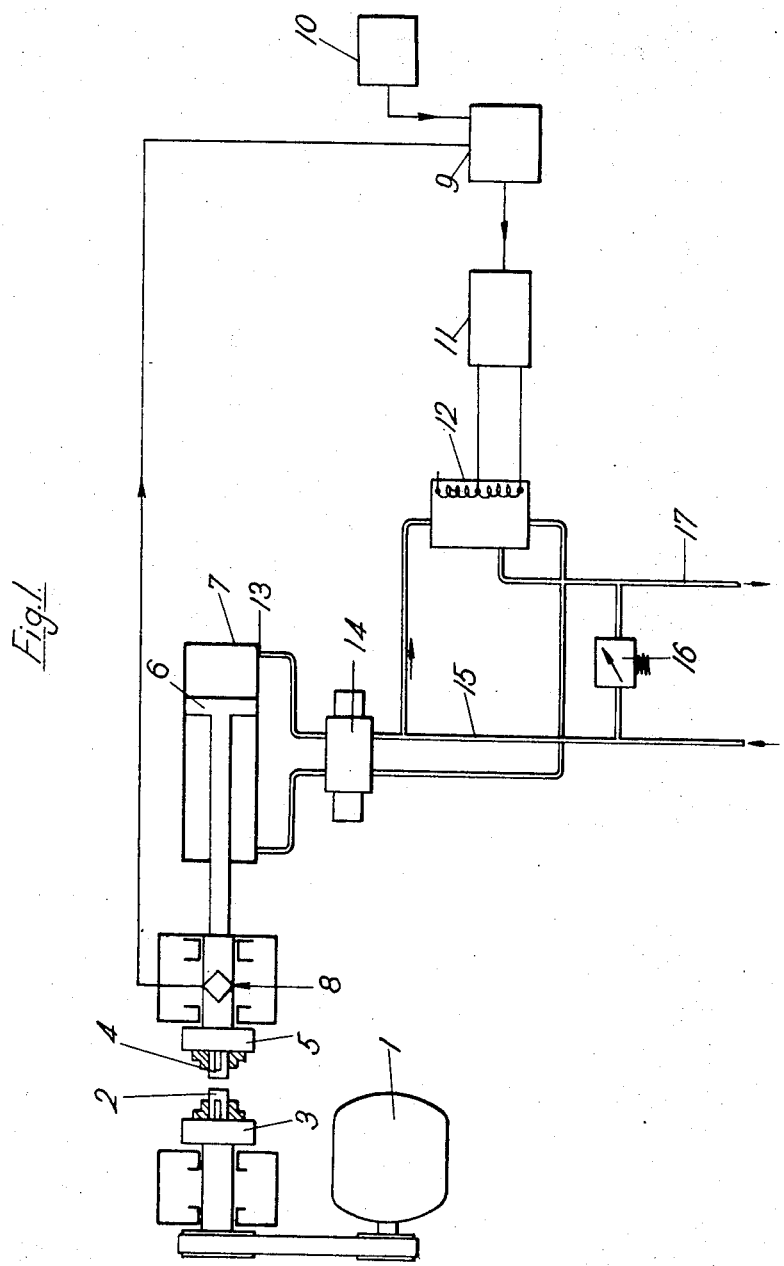
FIG. 1 shows diagrammatically the friction welding and control apparatus.

In FIG. 1, a motor 1 rotates a first workpiece 2 in a chuck 3. The end of a nonrotating workpiece 4 in a chuck 5 is brought into contact with the end of the workpiece 2 and an axial force is applied to the contacting faces by a piston 6 in a hydraulic cylinder 7 responding to the closed loop control system described below.

A torque meter 8 in the form of a torque-reacting device is connected to the stationary shaft and applies a torque signal to an amplifier 9. This amplifier also receives a command control signal from a preset device 10 and the output of the amplifier 11 represents the difference between the torque and commond signals. The amplifier output is applied to a solenoid in a servo valve 12 which acts through the direction selector valve 14 to control the pressure at the port 13 of the cylinder 7. The control system adjusts the force level in accordance with the fluctuations of the transmission load during the welding cycle by modulating the leakage from the pressure supply line 15 through the servo valve. The spool of the servo valve is displaced to an extent dependent upon the amplitude of the energising current from the amplifier. If the torque signal is equal to the command signal, the spool is in a neutral pressure-balanced position and provides a controlled leakage. With no load on the transmission, the control circuit is fully out of balance and the servo valve is closed; as the load increases to the command level the servo valve current bias will vary and the valve spool will follow this bias and adjust the bypass leakage through the valve, thereby controlling the pressure in the cylinder. If the torque signal rises above the command signal the current will increase further and this will increase the bypass leakage from the pressure line through the servo valve. To withdraw the piston 6, the selector valve 14 is reversed. A relief valve 16 is connected between pressure and return lines 15 and 17. If desired, the servo valve could be connected into both the pressure and return lines; both solenoids of the servo valve would be connected to the amplifier output and by thus controlling the fluid flow into and out of the two ends of the cylinder the valve would control the axial force applied by the piston. We prefer, however, to use the servo valve as a leakage controller connected to the pressure line.

The electro-hydraulic servo valve 12 may be of the kind sold under the trade name Pegasus and available from Telehoist Limited of Cheltenham, England.

As shown in FIG. 2a in a typical friction welding cycle without the proposed feedback, the torque increases rapidly in the first half-second and at the same time the axial force increases steadily towards its required value. In the initial stages, there are great fluctuations of torque because the interfaces are cold and have not yet warmed to one another. These fluctuations gradually decrease, but the torque continues to rise for the first half-second, after which there is a slow falling off to a steady value reached after about one-and-a-quarter seconds. It will be seen that for most of the period during which the torque value is above this ultimate steady value, the axial force is also high. This results in a demand on the driving system which is considerably higher than that required in the later part of the cycle, after the torque has reached its steady value. It will be appreciated that the curves shown in FIG. 2a do not show the application of the final upset pressure.

When a feedback control of the kind described is introduced into the system, the early torque peaks rapidly bring the feedback system into the control range so that the servo valve current causes a displacement of the valve spool from its closed position and a consequent reduction in the rate of increase of axial force. As a consequence, the torque increase will also be slowed, the mean line of the torque fluctuations increasing gradually over the first second. Although torque fluctuations are still present, they do not reach as high a value as those in the curve of FIG. 2a. At the end of the first second the torque curve of FIG. 2b becomes more even and has approximately the desired ultimate value. Generally speaking, the upset or "flash" is less with feedback control than when such control is not in operation.

An advantage of the system described is that the selection of a torque level will automatically determine a compatible force level, thus rendering unnecessary a separate force control. If the torque level is increased, the initial torque deficiency will result in an increase in force which in turn will tend to increase the torque. In the example shown, the reference level is such that the steady force level is approximately the same with and without feedback, but the reference level can be so selected that it permits an increase in axial force, above that which would have been used without feedback, after the initial torque fluctuations. This permits better utilisation of the available power in the period from the end of the first second until the rotary driving force is disconnected. It will be appreciated, however, that in the example of FIG. 2b the feedback system could be switched out of operation at any time after the end of the first second. It will also be appreciated that it is not essential for the command control signal to be constant during the operation of the feedback system. It may in some cases be desirable for this signal to vary in accordance with a predetermined programme.

Thus, in the method employing the invention, the process itself controls the applied force and in this way reduces the power requirements. The invention is of particular interest in connection with the friction welding of large joints requiring some hundreds or even thousands of horsepower and in such cases, it may enable a motor rating to be reduced to about two-thirds of the value which would be required without the feedback system. The invention is also of great interest with driving systems of the kind which stall on any overload, for example hydrostatic transmission systems.

Although the control system described is intended for a constant speed drive, it can also be adapted for use with other forms of driving system. With a hydrostatic transmission, a pressure transducer could be used in place of the torque meter and would perform a similar function.

Where an automatic timer is to be brought into operation to control the termination of the weld, a pressure switch can be set to operate at a value of force which may occur during the relative rotation, when the torque reaches a stable level in the steady state condition. The operation of the pressure switch can initiate the timer operation, the timer controlling the final arrest of the rotating workpiece and the application of the upset force. The time interval is selected to allow the material to stabilise itself in a fully heat-saturated condition. Alternatively, a displacement or "upset" switch may control the initiation of the timing operation, the switch being operated when the axially movable chuck has moved through a predetermined distance following the bringing of the workpiece surfaces into contact.

What is claimed is:
1. A method of closed loop control of the load on a transmission system used in friction welding in which two workpieces have their surfaces to be joined in contact with another and are given a relative rotation under axial pressure to cause frictional heating at the said surfaces, the relative rotation being stopped when the temperature at the surfaces is sufficient and the axial pressure being maintained or increased to form the weld, the method comprising the steps of:
  measuring the torque load on a transmission system used to provide the relative rotation of the workpieces to derive a signal proportional to the load;
  comparing said signal with a reference signal to derive a control signal representing the difference between the reference signal and the load-representing signal;
  and modifying the axial pressure applied to the workpieces in order to vary the load in accordance with said control signal at least in the initial period of frictional heating cycle, whereby during said initial period the torque is prevented from rising substantially in excess of its subsequent steady value.

2. A method as defined in claim 1 including the step of continuing to modify the axial pressure in response to said control signal substantially until the speed of relative rotation of the workpieces drops as a consequence of the disconnection of the rotary drive whereby a better utilization of available power is obtained.

References Cited
UNITED STATES PATENTS

| | | | |
|---|---|---|---|
| 3,234,644 | 2/1966 | Hollander | 29—470.3 |
| 3,234,645 | 2/1966 | Hollander et al. | 29—470.3 |
| 3,235,158 | 2/1966 | Hollander | 29—470.3 |
| 3,337,108 | 8/1967 | Taylor | 29—470.3 |
| 3,455,494 | 7/1969 | Stamm | 228—2 |
| 3,462,826 | 8/1969 | Farmer et al. | 29—470.3 |

JOHN F. CAMPBELL, Primary Examiner

R. J. CRAIG, Assistant Examiner

U.S. Cl. X.R.

228—2